United States Patent [19]

Heimberger et al.

[11] 4,137,166

[45] Jan. 30, 1979

[54] PROCESS FOR THE PURIFICATION OF WASTE WATER CONTAINING AMMONIA AND AMMONIUM SALTS

[75] Inventors: Werner Heimberger, Hanau; Hermann Schmitt, Rodenbach, both of Germany

[73] Assignee: Deutsche Gold- und Silber-Scheideanstalt vormals Roessler, Frankfurt, Germany

[21] Appl. No.: 798,949

[22] Filed: May 20, 1977

[30] Foreign Application Priority Data

May 29, 1976 [DE] Fed. Rep. of Germany ....... 2624256

[51] Int. Cl.$^2$ .............................................. C02B 1/36
[52] U.S. Cl. .............................. 210/62; 210/DIG. 28
[58] Field of Search ................... 210/62, DIG. 28, 59, 210/DIG. 1, 60

[56] References Cited

U.S. PATENT DOCUMENTS

| | | | |
|---|---|---|---|
| 3,732,164 | 5/1973 | Pressley et al. | 210/62 |
| 3,733,266 | 5/1973 | Bishop et al. | 210/62 |

OTHER PUBLICATIONS

Garrison; W. E. et al., "Improved Hypochlorination Techniques and Problems in Disinfection of Municipal Wastewaters Containing Refinery Thiosulfate", Proc. of the 28th Eng. Waste Conf. of Purdue University, pp. 309-322 (1973).

*Primary Examiner*—Frank A. Spear, Jr.
*Assistant Examiner*—Benoit Castel
*Attorney, Agent, or Firm*—Cushman, Darby & Cushman

[57] ABSTRACT

There is provided a process for the purification of ammonia or ammonium salt containing waste waters using alkali metal or alkaline earth metal hypochlorites comprising adjusting the waste water to an initial pH of 8–10.5 with an alkaline material and then treating the waste water with an alkali metal or alkaline earth metal hypochlorite in an amount practically equivalent to the ammonia or ammonium salt, in a given case while lowering the pH during the evolution of nitrogen by additional neutralization of this pH to about 6–8 whereupon only after the end of the evolution of nitrogen the pH of the waste water, if it deviates from 7, is adjusted to the neutral region in known manner. The initial pH is preferably adjusted with the help of an alkali or alkaline earth hydroxide, most preferably it is adjusted to a pH of 8–9 with the help of a buffer salt.

15 Claims, No Drawings

PROCESS FOR THE PURIFICATION OF WASTE WATER CONTAINING AMMONIA AND AMMONIUM SALTS

BACKGROUND OF THE INVENTION

Ammonium salt containing waste waters strongly favors the growth of algae in rivers and lakes and thereby reduces their oxygen content, while ammonia containing waste waters are highly toxic to fish. These types of waste waters cannot be discharged untreated into public waters.

Various methods are known for destroying the ammonium ion. However, these processes on the one hand are much too expensive industrially or for other reasons cannot be carried out on a large scale.

According to a well known method which also is used in practice to protect the environment, ammonium ions are converted to nitrogen by oxidation. The industrial oxidizing agent is chlorine which, among others, is used in the form of bleaching liquor or chloride of lime.

The amounts of chlorine added to be sure are high, the excess over the theoretical amount according to the equation

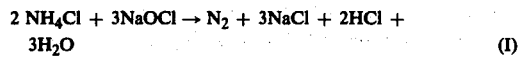

can amount to a multiple and even up to six times the theoretical amount, see Chem. Abst. 80 (1974) 63490g.

The complicated reaction of ammonia or ammonium ion with chlorine has been investigated many times, see Gmelin, 8th edition System No. 5 pages 285–286, as well as 490 and 497 wherein additional ideas on the manner of action of chlorine are discussed.

It is only certain that depending on the pH the 3 chloramines, namely, mono- and dichloramine and the explosive nitrogen trichloride appear during this reaction.

The exact limits given in the literature for the pH and the existence of the individual chloramines, see Chem. Abst. 48 (1954) 5705g, indeed are generally correct, i.e., if the same pH prevails in the entire reaction medium provided that the course of the reaction proceeds slowly enough. If this is not possible, however, and local pH differences occur, there can also be formed in a reaction medium having a high pH nitrogen trichloride which normally only exists at low pH. Because of the danger of explosion with nitrogen trichloride and its undesirable effects on the environment this makes it impossible to purify ammonia or ammonium salt containing waste water with chlorine or its compounds such as alkali or alkaline earth hypochlorites.

In Bishop U.S. Pat. No. 3,733,266 it is proposed to react chlorine with ammonia to form nitrogen and hydrochloric acid at a pH of 5.8 to 9.5, preferably in the range of 6–8. The equation for the reaction as shown on col. 3 last line is

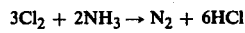

It is stated that there is used a Cl:NH$_3$—N weight ratio of about 8–10:1. This is above a chlorine atom to ammonia molecule ratio of 3:1. Bishop uses chlorine and a base such as sodium, potassium or calcium hydroxide to supply the chlorine and necessary pH. In place of these two materials Bishop can employ sodium hypochlorite, col. 5 lines 53–70.

It is important—according to the Bishop process—that the chloramines being still present after finishing the reaction can only be removed by an additional absorption stage with activated carbon.

The reaction between chlorine and ammonia to form nitrogen is therefore not quantitative.

The purpose of the present invention is to develop a process for the quantitative purification of waste water containing ammonia or ammonium salts without the formation of nitrogen trichloride.

SUMMARY OF THE INVENTION

It has now been found that waste water which contains ammonia or ammonium salts can be purified with alkali metal or alkaline earth metal hypochlorites quantitatively in a very short time and without formation of the explosive nitrogen trichloride if the waste water is adjusted to an initial pH of 8–10.5 with an alkaline material and then treated with an amount of alkali metal or alkaline earth metal hypochlorite in an amount practically equivalent to the ammonia or ammonium ion content according to the above recited equation (I), in a given case with reduction of the pH during the evolution of the nitrogen by additional neutralization of this pH to about 6–8 whereupon only after the end of the evolution of nitrogen the pH of the waste water, if it deviates from 7, is adjusted to the neutral range in known manner.

As hypochlorites there can be used for example sodium hypochlorite, potassium hypochlorite and calcium hypochlorite. The waste waters can contain ammonium ions from any of the usual ammonium salts, e.g., ammonium chloride, ammonium sulfate, ammonium bromide, ammonium acetate, etc.

By adjustment of the pH before addition of the hypochlorite solution to at least 8 and maintaining a pH of about 6–8 during the entire reaction, i.e., up to the end of the development of nitrogen, the development of nitrogen trichloride which has always been observed in the past is completely suppressed.

By the term "a pH of about 8" is meant a value which only immaterially goes below 8 and by a pH of 6–8 is meant a pH which does not go below 6.

In the known methods the pH sank during the reaction of the ammonia or ammonium ions with hypochlorite during the decomposition of ammonia or by the acid set free from the anion in the oxidation of the ammonium ion in the weakly acid or clearly acid region and as a result there is the possibility of formation of nitrogen trichloride, see Gmelin, 8th edition, loc. cit., page 285/286.

It is very favorable to work at an initial pH of 8 or 8–9 since it is very simple to adjust to this value and to hold the pH constant, namely, by using buffer salts. Examples of such buffers include lime or dolomite.

For example for the neutralization of ammonium chloride containing industrial waste waters there are especially used lime and dolomite (calcium magnesium carbonate) whose buffering effect is between pH 7 and 8. There can also be employed pure calcium carbonate or pure magnesium carbonate.

At a pH of 8 or 8–9 besides there immediately occurs an evolution of nitrogen which only begins after some time at a higher pH.

At the lower pH values the evolution of nitrogen is finished after a very short time, e.g., after practically 1–5 minutes, see Examples 12, 13 and 15.

Through this quick evolution of nitrogen and its quick completion it is possible to greatly reduce the dimensions of the container needed for the purification. The process is thus particularly suited for a continuous operation.

Without the use of buffer salts the pH can be adjusted and maintained with the help of aqueous alkaline solutions such as alkali hydroxides, e.g., sodium hydroxide or potassium hydroxide (see Examples 3–5) or alkaline earth metal hydroxides, e.g., milk of lime (calcium hydroxide) in continuous operation, naturally with the aid of control engineering.

It is assumed that with the mentioned initial values of the pH there is formed hydrazine as an intermediate (compared to an actual hydrazine formation at a higher pH) from the total ammonium ions or ammonia in the waste water (see for example, Examples 5 and 6 or 1 and 2) according to the equations:

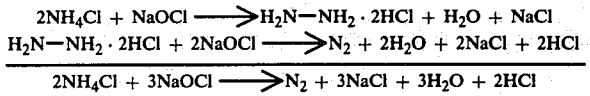

$$2NH_4Cl + NaOCl \longrightarrow H_2N-NH_2 \cdot 2HCl + H_2O + NaCl$$
$$H_2N-NH_2 \cdot 2HCl + 2NaOCl \longrightarrow N_2 + 2H_2O + 2NaCl + 2HCl$$
$$\overline{2NH_4Cl + 3NaOCl \longrightarrow N_2 + 3NaCl + 3H_2O + 2HCl}$$

(see Gmelin (8th edition) loc. cit. and Berichte 37 (1904) 4292).

In this manner there is excluded the formation of nitrogen trichloride.

The reaction is thus directed in the direction of hydrazine formation by previous regulation of the entire waste water to a pH of at least 8 before the addition of the hypochlorite solution and there is avoided any possibility of side reaction to form nitrogen trichloride thereby and by maintaining a pH value of about 6–8 during the entire reaction, i.e., until the end of the evolution of nitrogen.

In the previous oxidation of ammonia or ammonium salt containing waste waters with chlorine or hypochlorite these requirements were never correlated.

The temperature is not critical for the process. There can be used low temperatures such as room temperature (e.g., 20° C.) or higher temperatures at which the waste waters accrue. The preferred temperatures are 40°–60° C.

As practically equivalent amounts of alkali or alkaline earth hypochlorites there is meant the theoretical amounts according to equation (I), in a given case with an excess of 2–5 mol % of the hypochlorite.

However, it is also possible to produce the hypochlorite in situ in the waste waters, see Examples 8 and 14. However, this increases the reaction time, see the following table, values 2 and 5 in the column "Reaction Time" which refer to Examples 14 and 12.

Unless otherwise indicated all parts and percentages are by weight.

The invention will be explained further in the following examples.

DESCRIPTION OF THE PREFERRED EMBODIMENTS

Example 1

There were dropped into a solution of 20 grams of $NH_4Cl$ in 400 ml of water (5 weight % $NH_4Cl$) in a round-bottomed flask with stirring within 10 minutes at 40° C. 296 grams of bleaching liquor (corresponding to 41.79 grams NaOCl + 3 grams of NaOH), whereupon to begin the reaction the pH was adjusted to 9 by adding caustic soda solution (a total of 12 grams of NaOH). After a short time, the pH increased to 13.8 and only dropped within the addition of the last third of the bleaching liquor with strong development of gas.

Within 7 minutes 1.25 liters of nitrogen and within a further 3 minutes 3.5 liters of $N_2$ were set free. The solution then showed a pH of 7.5; it contained only 1 ppm $NH_4^+$ (=0.0001 weight %) and 0.09 grams of NaOCl which can be converted by addition of equivalent amounts of $Na_2SO_3$ solution into NaCl.

In the samples which were removed after 5–7 minutes reaction time, after acidification and decomposition of the NaOCl, hydrazine could be detected with salicylaldehyde. In Example 1 the weight ratio of chlorine from the hypochlorite to the $NH_3$—N is about 3.6:1.

Example 2

There were added to 400 ml of a 5 weight % $NH_4Cl$ solution at 20° C. with stirring in a round-bottomed flask within 10 minutes 296 grams of bleaching liquor (corresponding to 41.79 grams NaOCl + 3 grams NaOH), whereupon the pH was held at the beginning to 9 by dropping in some caustic soda solution (12 grams NaOH).

After a short time, the pH increased to 13.0 and only dropped upon the addition of the last third of the bleaching liquor. The solution warmed up to 50° C.

The development of gas, the pH and the residual content of $NH_4^+$ and NaOCl had the same values as given in Example 1.

The gas formed in the reaction was led through a 20% solution of $Na_2SO_3$.

By Kjeldahl analysis, there could not be detected

TABLE

| Neutralization Agent | pH Range | Oxidizing Agent | Reaction Time (min.) | Chlorine Content at End | | $NH_4Cl$ Content | |
|---|---|---|---|---|---|---|---|
| | | | | Total $N_2$ g | Total Soln g | Beginning g | End g |
| Marble | 10.6 | $Cl_2$ | 15 | 0.3 | 0.07 | 4.49 | — |
| Dolomite | 8.3–9.1 | $Cl_2$ | 15 | 1.5 | 0.05 | 4.49 | 0.05* |
| Dolomite | 3–4 | $Cl_2$ | 15 | 3.2 | 0.04 | 4.49 | 2.3 |
| none | −0.6 | $Cl_2$ | 15 | 5.4 | 0.06 | 5.04 | 2.9 |
| Dolomite | 8–9 | Ca(OCl)Cl | 1 | 0.05 | 0.05 | 4.49 | 0.035** |
| Dolomite | 8–9 | Ca(OCl)Cl | 3 | 0.05 | 0.06 | 4.49 | — |

*Example 14
**Example 12

The process can comprise, consist essentially of or consist of the steps set forth using materials comprising, consisting essentially of or consisting of those set forth.

$NH_3$, consequently the nitrogen set free was free of $NCl_3$.

Example 3

In a manner similar to Example 1 at 40° C. 6 ml of bleaching liquor (corresponding to 0.846 grams NaOCl) were dropped into 500 ml of an aqueous solution of 0.5 grams $(NH_4)_2SO_4$ (0.1 weight % $(NH_4)_2SO_4$) within 10 minutes. After a short time the pH of 10.2 dropped and then there had to be added a total of 7.5 ml of 1N NaOH (0.303 grams NaOH) to hold the pH between 9 and 8. After 5 minutes further reaction the pH of the solution stood at 7. It still contained 2 ppm $NH_4^+$ and 55 ppm NaOCl.

Example 4

In the manner of Example 3 there were dropped into 500 ml of a 0.05 weight % $(NH_4)_2SO_4$ containing aqueous solution at 40° C. 3 ml of bleaching liquor (0.423 grams NaOCl) within 10 minutes. After the start of the reaction the pH dropped from 10.0 and then there had to be added a total of 37.5 ml of 0.1N NaOH to hold the pH between 9 and 8. After 5 minutes of post reaction time the pH fell to 7.2.

There were found in the solution 1.5 ppm $NH_4^+$ and 56 ppm NaOCl.

Example 5

In the manner of Example 3 there were added to 500 ml of an aqueous solution of 0.005 weight % $(NH_4)_2SO_4$ at 40° C. 0.3 ml of bleaching liquor (corresponding to 0.0423 grams NaOCl) and then 3.75 ml of 0.1 N NaOH to hold the pH between 9 and 8.

The solution still contained 2 ppm $NH_4^+$ and 18.6 ppm NaOCl.

Example 6

500 ml of an aqueous solution of 0.25 grams $NH_4Cl$ (0.05 weight %) were adjusted to a pH of 8 with 12 ml of 1 N NaOH. To this solution there were then added with stirring within 10 minutes 30 ml of bleaching liquor (=0.52 gram NaOCl + 0.026 gram NaOH). Thereby at first there was established a pH of 10.5 without the setting free of $N_2$ and then the pH decreased slowly to 9 with development of $N_2$, then the pH fell further very quickly. To keep a pH of 7 it was necessary to add caustic soda solution, e.g., 1 N sodium hydroxide.

Example 7

500 ml of an aqueous solution of 5 grams of $NH_4Cl$ (1 weight %) was adjusted to a pH of 8 at 40° C. with a solution of 3.22 grams of NaOH in 50 ml of water.

There were then added to this solution with stirring within 10 minutes 66 ml of bleaching liquor (=10.45 grams NaOCl + 0.53 gram NaOH). Thereby a pH of 9.5 was established. After a short time (5 minutes) there took place the release of $N_2$ and under the development of heat the pH fell to 6.5. The solution was adjusted to a pH of 7 with 10 ml of 1 N NaOH. It no longer contained $NH_4Cl$.

Example 8

500 ml of an aqueous solution of 20 grams $NH_4Cl$ (4 weight %) was treated at 20° C. with 14.9 grams of NaOH and in all in 30 minutes there were blown in 39.8 grams of chlorine gas and simultaneously the pH was held at 11 to 11.5 by dropping in a solution of 44.8 grams of NaOH in 100 ml of water. At a temperature increase to 60° C. there was a strong release of $N_2$ and thereupon the pH fell to 6.8.

The solution still contained 7 ppm $NH_4Cl$.

Example 9

To 700 ml of an aqueous solution of 8.54 grams of $NH_4OH$ (1.22 weight %) which had a pH of 10.4 there were dropped in with stirring at 40° C. within 10 minutes 187 ml of bleaching liquor (=27.3 grams NaOCl + 1.38 grams NaOH) whereupon the pH increased to 12.6. After 5–7 minutes there began the development of $N_2$ and the giving off of heat of reaction, whereupon the pH fell to 9.2. Within 7–10 minutes after the beginning of the addition of the bleaching liquor the temperature increased to 56° C. with strong release of $N_2$. The solution was adjusted to neutral and was free of $NH_4^+$.

Example 10

700 grams of an aqueous 12 weight % hydrochloric acid (=84 grams HCl) which contained 10.5 grams $NH_4Cl$ (=1.5 weight %) were neutralized with $CaCO_3$ and adjusted to pH* with milk of lime. To the solution obtained there were added 7.3 grams of $Ca(OH)_2$ in the form of milk of lime (equivalent to the $NH_4Cl$ content) whereupon the pH increased to 9.4. There were then added at 40° C. with stirring within 10 minutes 150 ml of bleaching liquor (=21.9 grams NaOCl + 1.57 grams NaOH) whereupon the pH increased to 10.5. Up to 7 minutes of addition time there arose almost no nitrogen, however, after then with an increase in temperature to 57° C. there was observed a strong $N_2$ development. At the end of the reaction the pH of the solution which was 9.2 was adjusted to 7. It contained no $NH_4^+$ ion.

* of 7

Example 11

To an aqueous solution of 127.4 grams of $CaCl_2$ (18.2 weight %) and 6.86 grams of $NH_4OH$ (0.98 weight %) which had a pH of 10.2 there were added at 40° C. within 10 minutes with stirring 150 ml of bleaching liquor (=21.9 grams NaOCl + 1.57 grams NaOH), whereupon the pH increased to 10.6.

After 7 minutes of addition time the temperature increased to 57° C. and the pH dropped to 9.4 with strong $N_2$ development. The solution adjusted to neutral was free of $NH_4^+$ ions.

Example 12

700 ml of 14 weight % hydrochloric acid solution containing 4.49 grams of $NH_4Cl$ neutralized with dolomite to pH 3.4 had the pH adjusted to 8 with milk of lime and treated with an additional 6.3 grams of $Ca(OH)_2$ (equivalent amount to the $NH_4Cl$ content) to give a pH of 8.3 and heated to 50° C. Then there were added within 1 minute 110 ml of chloride of lime solution (=11.2 grams Ca(OCl)Cl = theory +5% excess), whereupon a strong development of nitrogen was released. A sample which was withdrawn after 45 seconds still contained 0.78% of the original $NH_4Cl$ content, i.e., already 99.2% of the $NH_4Cl$ was destroyed. After 5 minutes the solution was free from $NH_4Cl$ and the pH was 6.0. By addition of a little $Na_2SO_3$ solution or $H_2O_2$ the residual content of active chlorine was destroyed.

Example 13

700 Grams ml of a 12 weight % of HCl solution containing 10.5 grams of $NH_4Cl$ (1.5 weight % $NH_4Cl$) were employed. It was neutralized with dolomite (final pH = 3.4). By addition of milk of lime there was established a pH of 8 and with a further 7.3 grams of Ca- (OH)₂ (an amount equivalent to the NH₄Cl content) a pH of 8.3. To the solution heated to 50° C. there was then added within 1 minute 250 ml of chloride of lime solution (=26.2 grams Ca(OCl)Cl = theory + 5% excess) whereby there was released a strong development of nitrogen. After 5 minutes the solution was free of NH₄Cl. The final pH was 8.0. Residual active chlorine was removed with Na₂SO₃ solution.

Example 14

There was employed 700 ml of a 14 weight % of HCl solution containing 4.49 grams of NH₄Cl neutralized with dolomite. This solution was brought to a pH of 8 with milk of lime and adjusted to pH 8-9 with a further 6.2 grams of Ca(OH)₂ (an amount equivalent to the NH₄Cl content). There were then led into this solution at 50° C. for 15 minutes Cl₂ in such manner that only a little chlorine got through with the nitrogen developed (altogether 1.5 grams of chlorine got through). The solution was free of NH₄Cl and still contained 0.05 grams of active chlorine that was removed by addition of Na₂SO₃. Final pH 8.0.

Example 15

2.8 Liters of 14 weight % hydrochloric acid neutralized with dolomite to pH 3.4 was adjusted to pH 8.0 with milk of lime. The solution contained 15.7 grams of NH₄Cl which was converted into N₂ in a continuously operating cascade consisting of 2×100 ml round-bottomed flasks.

The NH₄Cl containing solution was so added to the first flask together with 253 ml/hour of bleaching liquor (=32.8 grams NaOCl, i.e., without excess) and 150 ml/h NaOH (=11.8 grams NaOH) that the feeding of the NH₄Cl containing solution was 46 ml/min, the bleaching liquor 4.2 ml/min and the NaOH 2.5 ml/min.

The pH in this way could be held between 6 and 7 (neutralization delay by slow reaction of precipitated Mg(OH)₂ with the hydrochloric acid set free).

The main reaction took place in flask 1, the second flask served merely for post reaction so that the average residence time was about 2.5 minutes.

With theoretical consumption of bleaching liquor the solution flowing out of the apparatus was free from NH₄Cl.

What is claimed is:

1. A process for the purification of ammonia or ammonium salt containing waste water using an alkali metal or alkaline earth metal hypochlorite, said waste water having a pH below 8, comprising initially raising the pH of the waste water to an initial pH of 8–10.5 with an alkaline material and then treating the waste water with an alkali metal or alkaline earth metal hypochlorite in an amount equivalent to the ammonia or ammonium salt to an amount up to 5% in excess of the equivalent amount of ammonia or ammonium salt, the equivalent of hypochlorite to ammonia or ammonium salt being 3 moles of OCl⁻ to 2 moles of NH₃ or NH₄⁺ according to the following equation:

$$2NH_4Cl + 3NaOCl \rightarrow N_2 + 3NaCl + 3H_2O + 2HCl,$$

so as to convert substantially all of the NH₃ or NH₄⁺ to nitrogen without the formation of nitrogen trichloride, and allowing the nitrogen formed in the reaction to evolve.

2. A process according to claim 1 including the step of reducing the pH to between 6 and 8 during the evolution of nitrogen.

3. A process according to claim 2 comprising adjusting the pH to about 7 after the evolution of nitrogen.

4. A process according to claim 2 comprising adding an alkali hydroxide or alkaline earth hydroxide to adjust the waste water pH initially to 8–10.5.

5. A process according to claim 4 wherein the pH is initially adjusted to 8–9.

6. A process according to claim 1 wherein the waste water contains ammonium hydroxide, ammonium chloride or ammonium sulfate.

7. A process according to claim 6 wherein the waste water contains ammonium hydroxide.

8. A process according to claim 6 wherein the waste water contains ammonium chloride.

9. A process according to claim 8 wherein the waste water also contains hydrochloric acid.

10. A process according to claim 9 wherein the waste water is partially neutralized with calcium carbonate, magnesium carbonate or calcium-magnesium carbonate prior to the initial pH adjustment.

11. A process according to claim 1 wherein the pH is initially adjusted to 8 to 9 with the aid of a buffer salt.

12. The process of claim 1 wherein the hypochlorite is sodium hypochlorite or calcium hypochlorite.

13. A process according to claim 1 wherein the hypochlorite is sodium hypochlorite and the weight ratio of chlorine from the sodium hypochlorite to the NH₃—N is about 3.6:1.

14. A process according to claim 1 wherein the waste water contains ammonium sulfate.

15. A process according to claim 1 wherein the waste water contains ammonium chloride or ammonium sulfate.

* * * * *